US006923431B2

(12) United States Patent
Yueh

(10) Patent No.: US 6,923,431 B2
(45) Date of Patent: Aug. 2, 2005

(54) THREE-SHIFT LIFTING MECHANISM FOR JACK OR THE LIKE

(75) Inventor: Ming-Chuan Yueh, Chia-I Hsien (TW)

(73) Assignee: Shinn Fu Corporation, Tao Yuan (TW)

( * ) Notice: Subject to any disclaimer, the term of this patent is extended or adjusted under 35 U.S.C. 154(b) by 115 days.

(21) Appl. No.: 10/667,660

(22) Filed: Sep. 23, 2003

(65) Prior Publication Data

US 2005/0062027 A1 Mar. 24, 2005

(51) Int. Cl.$^{7}$ .................................................. B60P 1/48
(52) U.S. Cl. .................... 254/8 B; 254/93 R; 254/93 H
(58) Field of Search .......................... 60/479, 477, 482, 60/481; 91/517, 519; 254/8 B, 93 R, 93 H

(56) References Cited

U.S. PATENT DOCUMENTS 3,806,091 A * 4/1974 Wride ...................... 254/93 R
6,035,635 A * 3/2000 Hung .......................... 60/481
6,581,909 B2 * 6/2003 Wixey ........................ 254/8 B

* cited by examiner

*Primary Examiner*—Robert C. Watson
(74) *Attorney, Agent, or Firm*—Bacon & Thomas PLLC

(57) ABSTRACT

A three-shift lifting mechanism includes a hydraulic device disposed at the front side of a valve block and adapted to lift a lifting tube to raise weights, the hydraulic device defining an oil accumulation chamber, a rapid-lifting oil chamber for rapid lifting of the lifting tube to the lifting position, and a high-pressure oil chamber for lifting the lifting tube to raise weights, a piston pump disposed at the back side of the valve block and defining a front working chamber and a rear buffer chamber, and oil passages so arranged that hydraulic oil can be supplied from the oil accumulation chamber and the rear buffer chamber to the front working chamber and then to the rapid-lifting oil chamber or the high-pressure oil chamber to lift the lifting tube.

8 Claims, 12 Drawing Sheets

THREE-SHIFT LIFTING MECHANISM FOR JACK OR THE LIKE

BACKGROUND OF THE INVENTION (a) Field of the Invention

The present invention relates to lifting mechanisms adapted to raise weights and, more particularly, to a three-shift lifting mechanism, which provides three lifting shifts, i.e., the first shift to lift the lifting tube rapidly when bearing no weights, the second shift to lift the lifting tube to raise the weights rapidly, and the third shift to buffer the lifting upon an overload at the lifting tube.

(b) Description of the Prior Art

A conventional lifting mechanism for use in a carriage jack or the like is generally comprised of a valve block, a hydraulic device, and a piston pump. The piston pump is driven by a crank to suck in hydraulic oil and then to pump hydraulic oil through oil passages in the valve block, causing the lifting tube of the hydraulic device to raise the weights. Because of simple oil passage design, this structure of lifting mechanism can only move the lifting rod at a predetermined speed, i.e., the lifting tube is lifted at a low speed either when the lifting tube bearing or not bearing weights. Due to this limitation, the user must employ much effort to repeatedly reciprocate the piston pump when lifting the lifting tube to the bottom side of the weights to be raised.

There are known dual-speed lifting mechanisms that enable the lifting tube to be moved to the bottom side of the weights at a high speed and then lifted to raise the weights at a low speed. However, these dual-speed lifting mechanism have no means to buffer the weights upon an overload. Upon an overload, the hydraulic device may be destroyed, or caused to leak oil. Further, the piston pump sucks in hydraulic oil only during its upstroke, i.e. the piston pump cannot simultaneously suck in hydraulic oil when pumping out hydraulic oil to lift the lifting tube.

Therefore, it is desirable to provide a three-shift lifting mechanism that eliminates the drawbacks of the conventional lifting mechanisms.

SUMMARY OF THE INVENTION

The present invention has been accomplished under the circumstances in view. It is the main object of the present invention to provide a three-shift lifting mechanism, which provides three lifting shifts, i.e., the first shift to lift the lifting tube rapidly when bearing no weights, the second shift to lift the lifting tube to raise the weights rapidly, and the third shift to buffer the lifting upon an overload at the lifting tube. To achieve this and other objects of the present invention, the three-shift lifting mechanism comprises a hydraulic device, the hydraulic device comprising a cylindrical casing, a barrel, a lifting tube, and a small center tube, the casing being a double open end cylinder, the barrel being a double open end member axially inserted into the inside of the casing and defining with the casing an oil accumulation chamber in between the casing and the barrel, the lifting tube being an one open side tube axially mounted in the barrel and forwardly extended out of the casing and adapted to lift the weights, the lifting tube having an axial center hole axially extended to a rear open side thereof, a piston ring disposed at the periphery thereof near the rear open side and pressed on an inside wall of the barrel, and a high-pressure oil chamber defined within the barrel behind the piston ring, the small center tube being a double open side tube inserted into the axial center hole inside the lifting tube and defining therein a rapid-lifting oil chamber; a piston pump adapted to pump hydraulic oil into the hydraulic device to lift the lifting tube, the piston pump comprising a housing and a plunge axially slidably mounted in the housing, the housing being a hollow cylindrical member having at least one oil hole cut through the periphery thereof in communication with the inside space thereof, the plunger comprising a piston of relatively bigger diameter disposed at a front side inside the housing and a piston rod of relatively smaller diameter disposed at a rear side and extended out of the housing, the piston having a plurality of annular flanges extended around the periphery thereof and pressed on an inside wall of the housing and defining the inside space of the housing into a front working chamber and a rear buffer chamber, the piston having an oil hole axially backwardly extended from the center of a front side thereof and then turned sideways to the periphery thereof in communication between the front working chamber the rear buffer chamber, and an one-way valve means formed of a spring member and a steel ball and mounted in the oil hole of the piston to control one-way flowing of hydraulic oil from the rear buffer chamber to the front working chamber; and a valve block adapted to accommodate the hydraulic device and the piston pump, the valve block comprising a front coupling flange fitted into a rear open side of the cylindrical casing, a recessed portion disposed at the center of the front coupling flange and adapted to accommodate the barrel and the small center tube, a rear receiving hole adapted to accommodate the piston pump and to block the front working chamber, a first oil passage extended from the oil accumulation chamber to the front working chamber, a second oil passage extended from the front working chamber to the high-pressure oil chamber and the rapid-lifting oil chamber, a third oil passage extended from the oil accumulation chamber to the high-pressure oil chamber, a fourth oil passage extended from the oil accumulation chamber to the rear buffer chamber, a fifth oil passage shunted from the second oil passage and extended to the rear buffer chamber, a sixth oil passage extended from the rapid-lifting oil chamber to the oil accumulation chamber, and a seventh oil passage extended from the high-pressure oil chamber to the oil accumulation chamber. By means of the aforesaid arrangement, hydraulic oil is supplied from the rear buffer chamber and the oil accumulation chamber to the front working chamber for pumping to the rapid-lifting oil chamber or the high-pressure oil chamber to lift the lifting tube rapidly either when the lifting tube bearing or not bearing weights, and the hydraulic oil supply speed is reduced upon an overload at the lifting tube to prevent damage. During pumping of hydraulic oil into the high-pressure oil chamber or upon an overload, hydraulic oil is simultaneously guided into the rear buffer chamber of the piston pump for enabling the front working chamber to suck in hydraulic oil from the rear buffer chamber and the oil accumulation chamber for further quick pumping action.

DETAILED DESCRIPTION OF THE PREFERRED EMBODIMENTS

Figure 1:
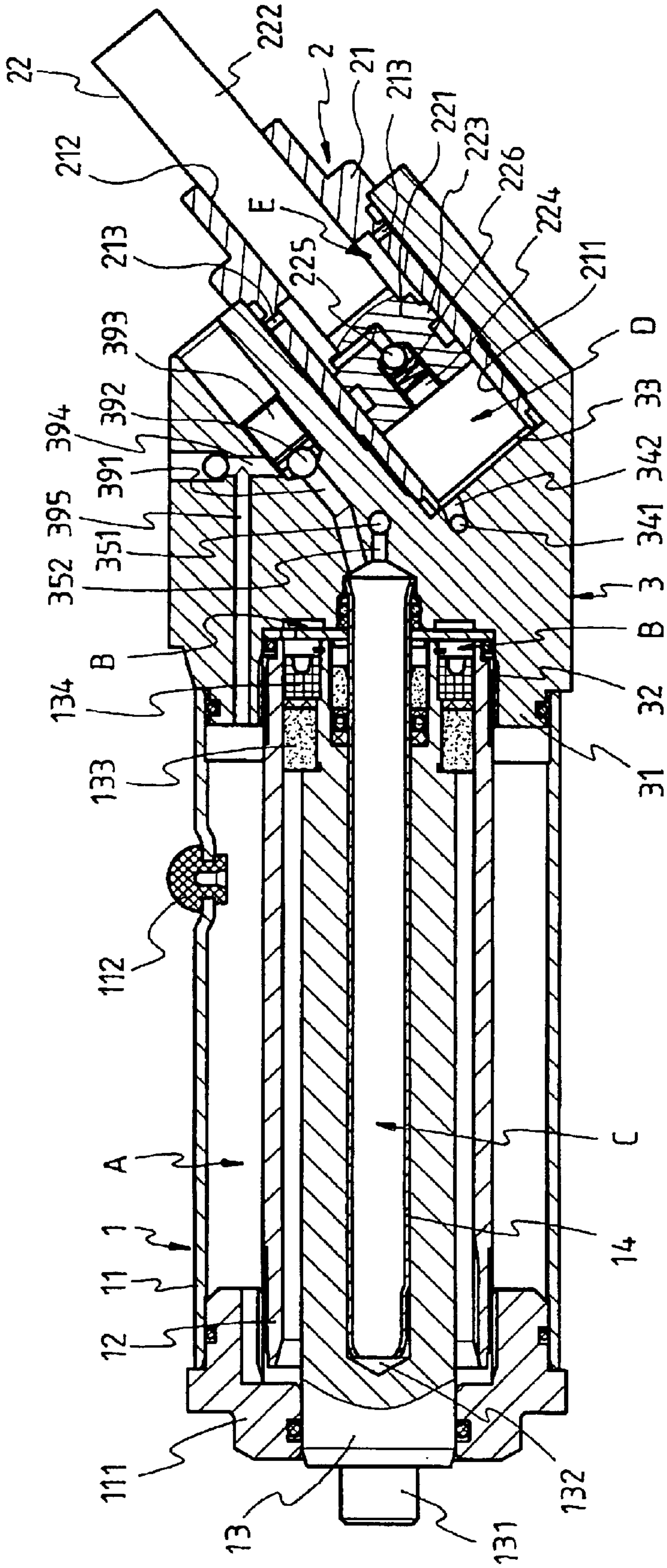
FIG. 1 is a sectional view of a three-shift lifting mechanism according to the present invention.
Figure 2:
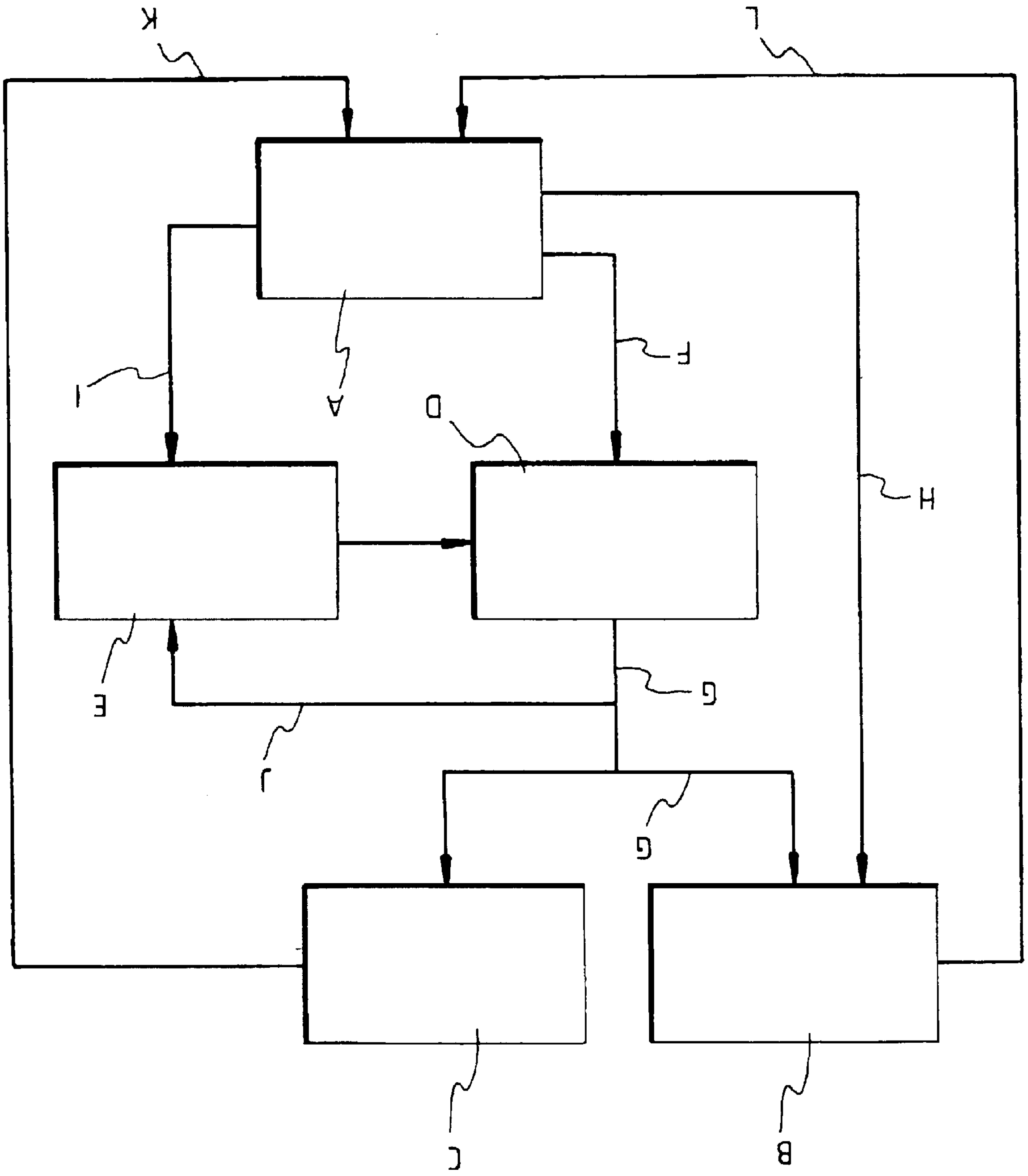
FIG. 2 is a block diagram showing the linking status of the oil chambers and oil passages according to the present invention.
Figure 3:
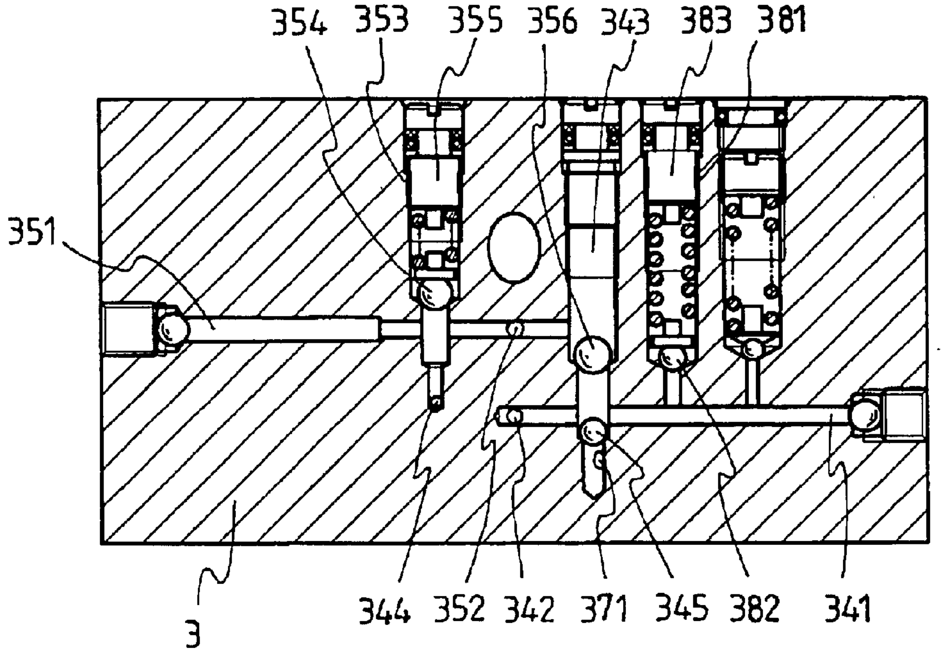
FIG. 3 is a sectional view of the valve block according to the present invention.
Figure 18:
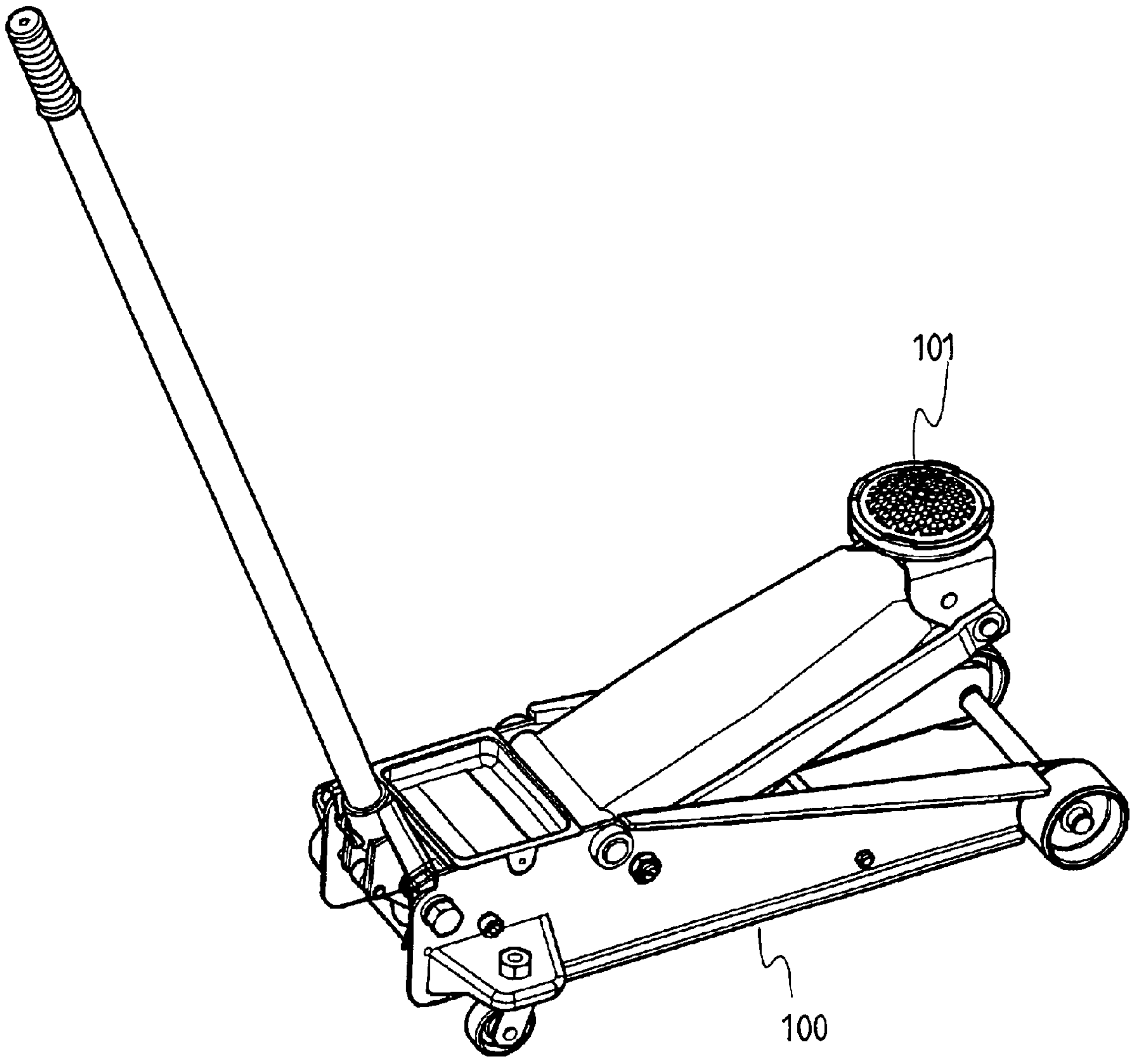
FIG. 18 shows the three-shift lifting mechanism used in a jack according to the present invention.

Referring to FIGS. 1~3, a three-shift lifting mechanism in accordance with the present invention can be installed in a jack 100 (see FIG. 18) or used directly to lift heavy weights, comprising a hydraulic device 1, a piston pump 2, and a valve block 3.

The hydraulic device 1 (see FIG. 1) comprises a cylindrical casing 11, a barrel 12, a lifting tube 13, and a small center tube 14. The casing 11 is a double open end cylinder having the front side mounted with an oil seal ring 111 and the periphery provided with a stopper 112. The barrel 12 is a double open end member axially inserted into the inside of the casing 11, having the front open side in communication with the casing 11 via the oil seal ring 111. Therefore, an oil accumulation chamber A is defined between the casing 11 and the barrel 12. The lifting tube 13 is an one open side tube adapted to lift the bearing pan 101 of the jack 100, having front coupling rod 131 axially forwardly extended from the front close side and coupled to the bearing pan 101 of the jack 100, an axial center hole 132 axially extended to the rear open side, a piston ring 133 disposed at the periphery near the rear open side, and a locating device 134 disposed at the periphery adjacent to the piston ring 133. The lifting tube 13 is axially mounted in the barrel 12, keeping the front coupling rod 131 disposed outside the oil seal ring 111 and the piston ring 133 pressed on the inner diameter of the barrel 12. Therefore, a high-pressure oil chamber B is defined within the barrel 12 behind the piston ring 133. Hydraulic oil can be pumped into the high-pressure oil chamber B to drive the lifting tube 13 to lift the load. The small center tube 14 is a double open side tube inserted into the axial center hole 132 inside the lifting tube 13, defining therein a rapid-lifting oil chamber C into which hydraulic oil is pumped to lift the lifting tube 13 rapidly.

Figure 7:
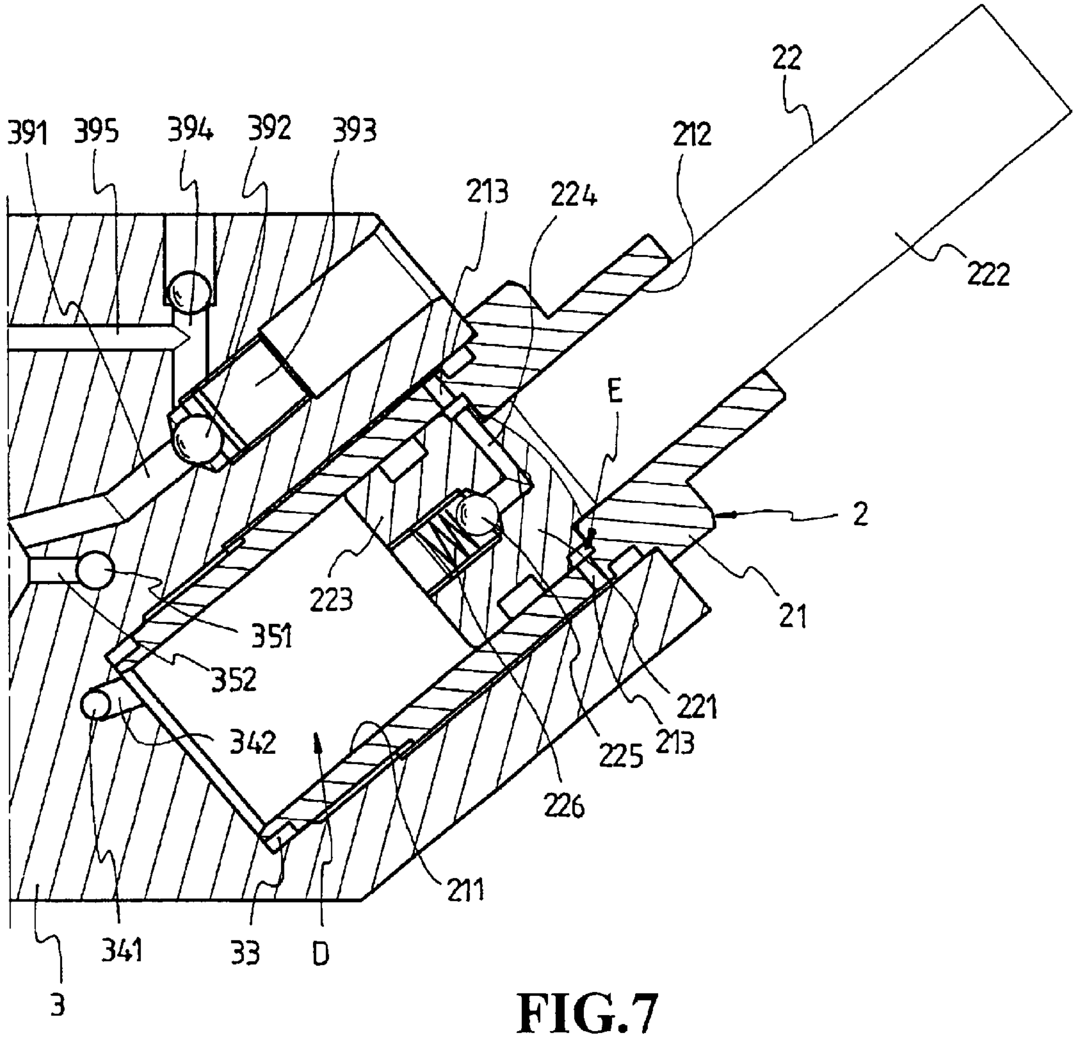
FIG. 7 is a sectional view of the piston pump according to the present invention.

The piston pump 2 (see FIGS. 1 and 7) is provided for operation by the user to pump hydraulic oil into the hydraulic device 1 to lift the lifting tube 13, comprised of a housing 21 and a plunger 22. The housing 21 is a hollow cylindrical member having a front oil chamber 211, a rear axle hole 212 in communication with the bottom side of the front oil chamber 211, and a plurality of oil holes 213 cut through the periphery in communication with the oil chamber 211. The plunger 22 is axially slidably mounted in the housing 21, having a piston 221 of relatively bigger diameter disposed at the front side inside the oil chamber 211 and a piston rod 222 of relatively smaller diameter disposed at the rear side and extended out of the rear side of the housing 21. The piston 221 has a plurality of annular flanges 223 extended around the periphery and pressed on the peripheral wall of the oil chamber 211 (i.e., the inner diameter of the housing 21). Therefore, the piston 221 divides the oil chamber 211 into a front working chamber D and a rear buffer chamber E. Further, the piston 221 has an oil hole 224 axially backwardly extended from the center of the front side then turned sideways to the periphery in communication between the front working chamber D and the rear buffer chamber E, an one-way valve formed of a spring member 226 and a steel ball 225 and mounted in the oil hole 224 to control one-way flowing of hydraulic oil from the rear buffer chamber E to the front working chamber D.

The valve block 3 (see FIGS. 1 and 2) is mounted inside the jack 100 and adapted to accommodate the hydraulic device 1 and the piston pump 2 and to link the oil accumulation chamber A, the high-pressure oil chamber B, the rapid-lifting oil chamber C, the front working chamber D, and the rear buffer chamber E. The valve block 3 comprises a front coupling flange 31 fitted into the rear open side of the cylindrical casing 11, a recessed portion 32 disposed at the center of the front coupling flange 31, which receives the barrel 11 and the small center tube 14, a rear receiving hole 33, which accommodates the piston pump 2 and blocks the front working chamber D, a first oil passage F extended from the oil accumulation chamber A to the front working chamber D, a second oil passage G extended from the front working chamber D to the high-pressure oil chamber B and the rapid-lifting oil chamber C, a third oil passage H extended from the oil accumulation chamber A to the high-pressure oil chamber B, a fourth oil passage I extended from the oil accumulation chamber A to the rear buffer chamber E, a fifth oil passage J shunted from the second oil passage G and extended to the rear buffer chamber E, a sixth oil passage K extended from the rapid-lifting oil chamber C to the oil accumulation chamber A, and a seventh oil passage L extended from the high-pressure oil chamber B to the oil accumulation chamber A.

As indicated above, the first oil passage F extends from the oil accumulation chamber A to the front working chamber D. As shown in FIGS. 1 and 3, the first oil passage F is formed of a first transverse oil hole 341, an oil hole 342 extended from the bottom end of the first transverse oil hole 341 to the rear receiving hole 33 (i.e., the front working chamber D of the housing 21), a stepped first longitudinal oil hole 343 extended across the first transverse oil hole 341, an oil hole 344 extended from the bottom end of the stepped first longitudinal oil hole 343 to the front side of the valve block 3 in communication with the oil accumulation chamber A of the barrel 11, and an one-way valve formed of a steel ball 345 mounted in the stepped first longitudinal oil hole 343 and stopped between the oil hole 344 and the oil hole 342. Upon upstroke of the piston pump 2, hydraulic oil is pumped out of the oil accumulation chamber A to push the steel ball 345 out of position and then to pass to the front working chamber D.

Figure 4:
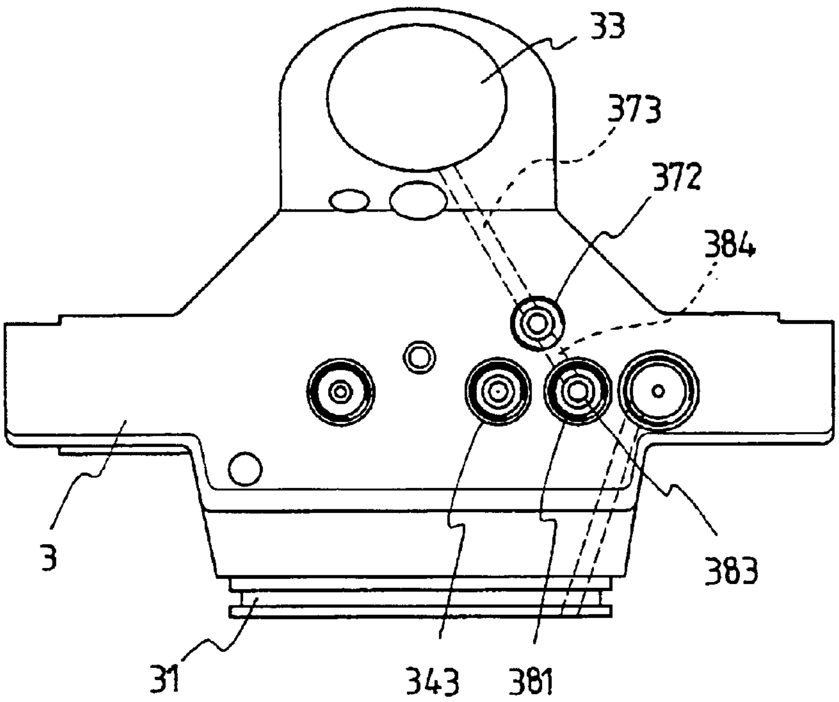
FIG. 4 is a top view of the valve block according to the present invention.

As indicated above, the second oil passage G extends from the front working chamber D to the high-pressure oil chamber B and the rapid-lifting oil chamber C. As shown in FIGS. 1, 3, and 4, the second oil passage G is formed of a second transverse oil hole 351 in fluid communication with the first longitudinal oil hole 343, an oil hole 352 extended from the second transverse oil hole 351 to the rapid-lifting oil chamber C (see FIG. 1), a second longitudinal oil hole 353 extended across the second transverse oil hole 351, a steel ball 354 mounted in the second longitudinal oil hole 353 and worked as an one-way valve means, a pressure regulator 355 disposed at the top end of the second longitudinal oil hole 353, an oil hole (not shown) extended from the second longitudinal oil hole 353 to the high-pressure oil chamber B, a steel ball 356 mounted in the first longitudinal oil hole 343 between the first transverse oil hole 341 and the second transverse hole 351. Upon down (compression) stroke of the piston pump 2, hydraulic oil passes out of the front working chamber D to push open the steel ball 356 and to pass to the inside of the rapid-lifting oil chamber C, or to further push open the steel ball 354 and the pressure regulator 355 and then to pass to the inside of the high-pressure oil chamber B, and therefore the lifting tube 13 is rapidly lifted to the bottom side of the weights (first shift), or forced to lift the weights (second shift).

Figure 5:
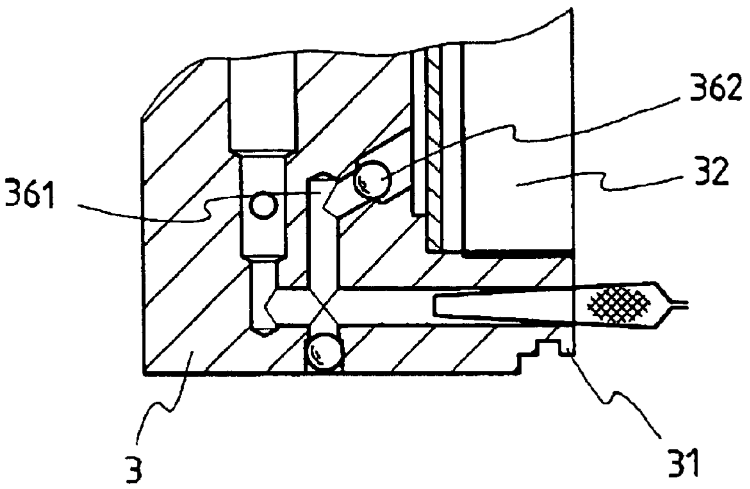
FIG. 5 is a sectional view of the third oil passage according to the present invention.

As indicated above, the third oil passage H extends from the oil accumulation chamber A to the high-pressure oil chamber B. As shown in FIGS. 2 and 5, the third oil passage H comprises a curved oil hole 361 extended from the front side of the front coupling flange 31 of the valve block 3 to the recessed portion 32, a steel ball 362 mounted in the oil hole 361 and worked as one-way valve means. During rapid lifting of the lifting tube 13, hydraulic oil is supplied from the oil accumulation chamber A to fill up the high-pressure oil chamber B for further pumping by the piston pump 2 to force the lifting tube 13 to lift the weights.

Figure 6:
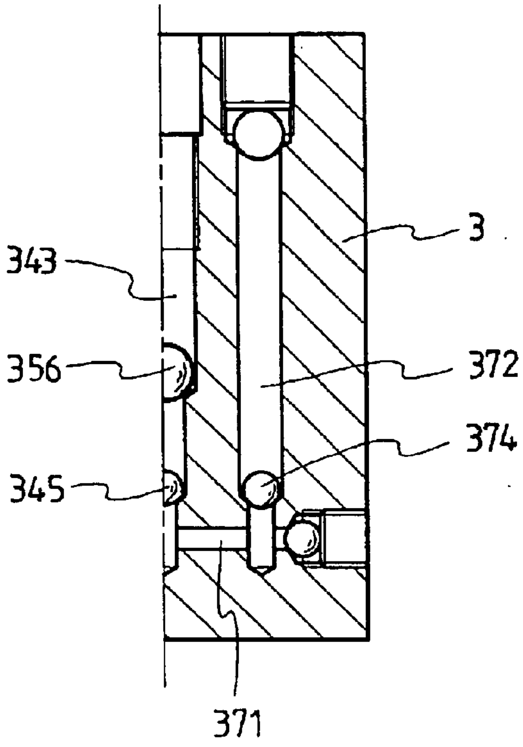
FIG. 6 is a sectional view of the fourth oil passage according to the present invention.

As indicated above, the fourth oil passage I extends from the oil accumulation chamber A to the rear buffer chamber E. As shown in FIGS. 2, 4, and 6, the fourth oil passage I comprises an oil hole 371 shunted from the first longitudinal oil hole 343 below the steel ball 345, a third longitudinal oil hole 372 disposed inside the valve block 3 and across the oil hole 371, an oil hole 373 extended from the third longitudinal oil hole 372 to the rear receiving hole 33, a steel ball 374 mounted in between the oil hole 372 and the oil hole 373 and working as one-way valve means. Further, by means of the oil holes 213 at the housing 21, the oil hole 373 is in fluid communication with the rear buffer chamber E. Upon down stroke of the piston pump 2, hydraulic oil is sucked from the oil accumulation chamber A into the rear buffer chamber E.

As indicated above, the fifth oil passage J is shunted from the second oil passage G and extended to the rear buffer chamber E. As shown in FIGS. 2~4, the fifth oil passage J is formed of a fourth longitudinal oil hole 381 in fluid communication with the first transverse oil hole 341, a steel ball 382 mounted in the fourth longitudinal oil hole 381 and working as one-way valve means, a pressure regulator 383 mounted in the fourth longitudinal oil hole 381 above the steel ball 382, and an oil hole 384 in fluid communication between the fourth longitudinal oil hole 381 and the third longitudinal oil hole 372. Upon an overload at the lifting tube 13, a part of hydraulic passes through the fifth oil passage J to the rear buffer chamber E, and a part of hydraulic oil pushes open the steel ball 354 and the pressure regulator 355 and then passes to the high-pressure oil chamber B to push the lifting tube 13 and to overcome the overload, achieving safety lifting (third shift).

As indicated above, the sixth oil passage K extends from the rapid-lifting oil chamber C to the oil accumulation chamber A. As shown in FIGS. 1 and 2, the sixth oil passage K is formed of an oil hole 391 disposed at the recessed portion 32 of the valve block 3, a steel ball 392 mounted in the oil hole 391 and working as one-way valve means for enabling hydraulic oil to pass from the rapid-lifting oil chamber C to the oil accumulation chamber A, a pressure regulator 393 mounted in the oil hole 391 above the steel ball 392, an oil hole 394 in fluid communication with the oil hole 391, an oil hole 395 extended from the oil hole 394 to the front side of the front coupling flange 31 in fluid communication with the oil accumulation chamber A. Upon return stroke of the lifting tube 13, hydraulic oil returns from the rapid-lifting oil chamber C to the oil accumulation chamber A.

As indicated above, the seventh oil passage L extends from the high-pressure oil chamber B to the oil accumulation chamber A (see FIG. 2). The seventh oil passage L is an oil hole having one-way valve means, for example, a steel ball mounted therein to control the flowing direction of hydraulic oil. Upon return stroke of the lifting tube 13, hydraulic oil flows backwards from the high-pressure oil chamber B to the oil accumulation chamber A via the seventh oil passage L.

Figure 8:
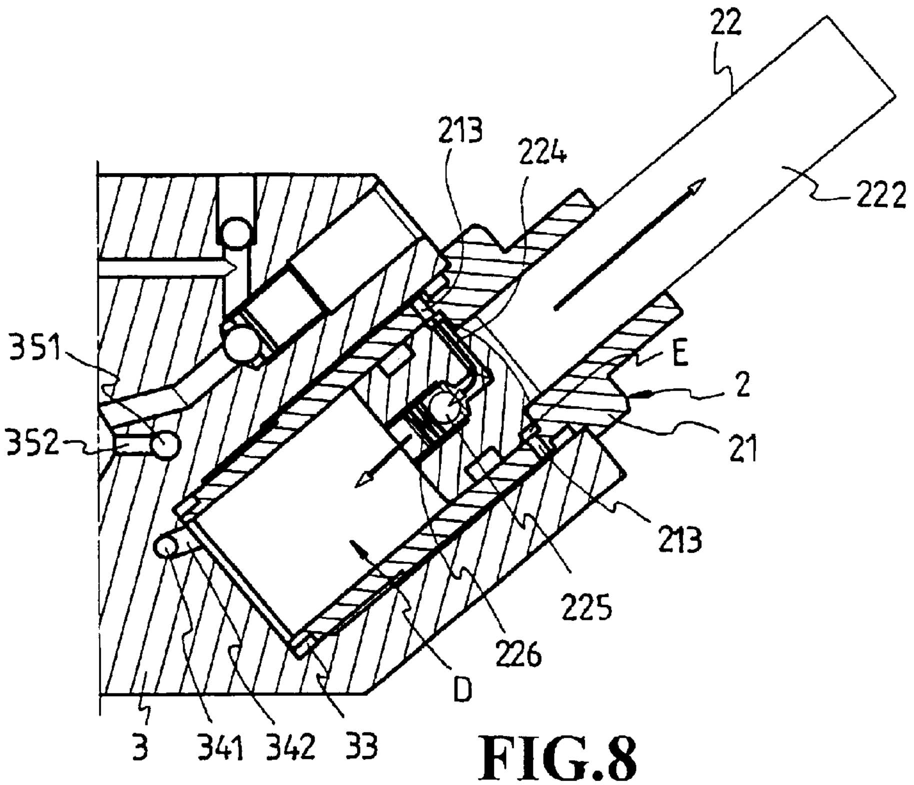
FIG. 8 is a schematic drawing showing the action of the piston pump according to the present invention (I).
Figure 9:
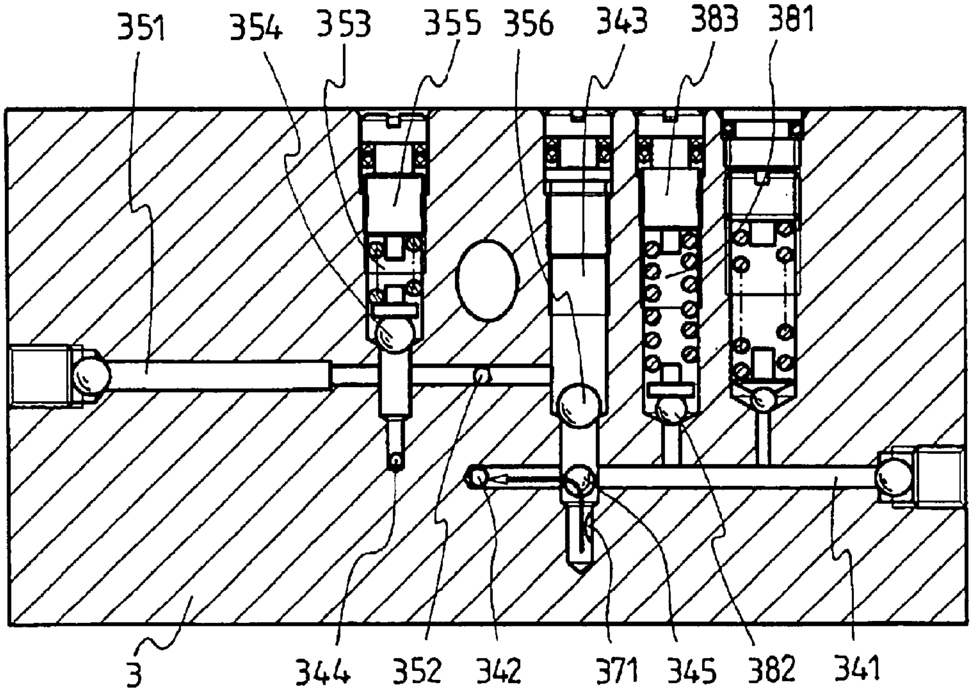
FIG. 9 is a schematic drawing showing the action of the piston pump according to the present invention (II).
Figure 10:
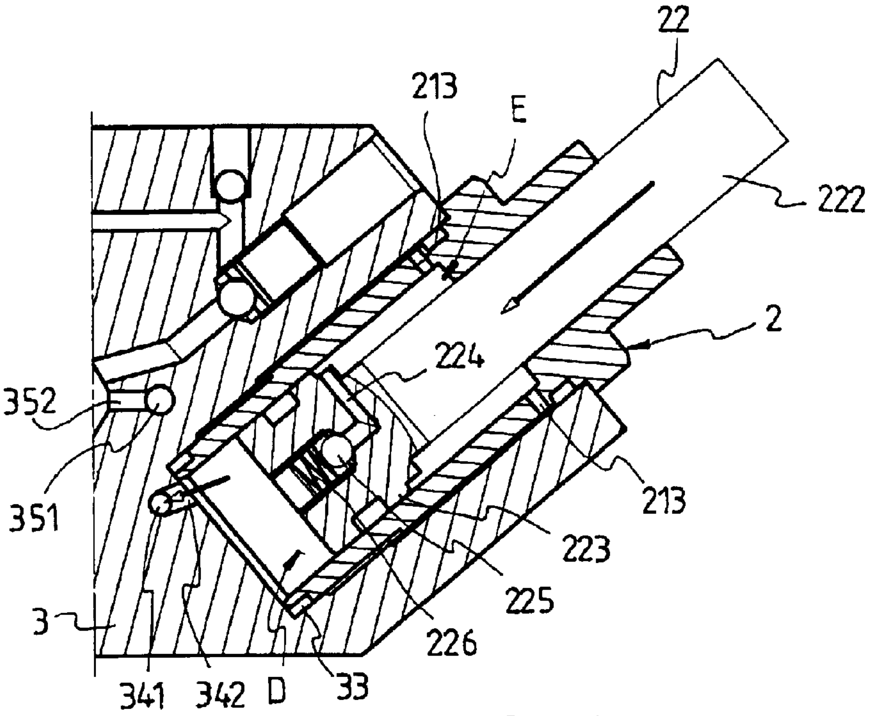
FIG. 10 is a schematic drawing showing hydraulic oil pumped into the second oil passage according to the present invention.
Figure 11:
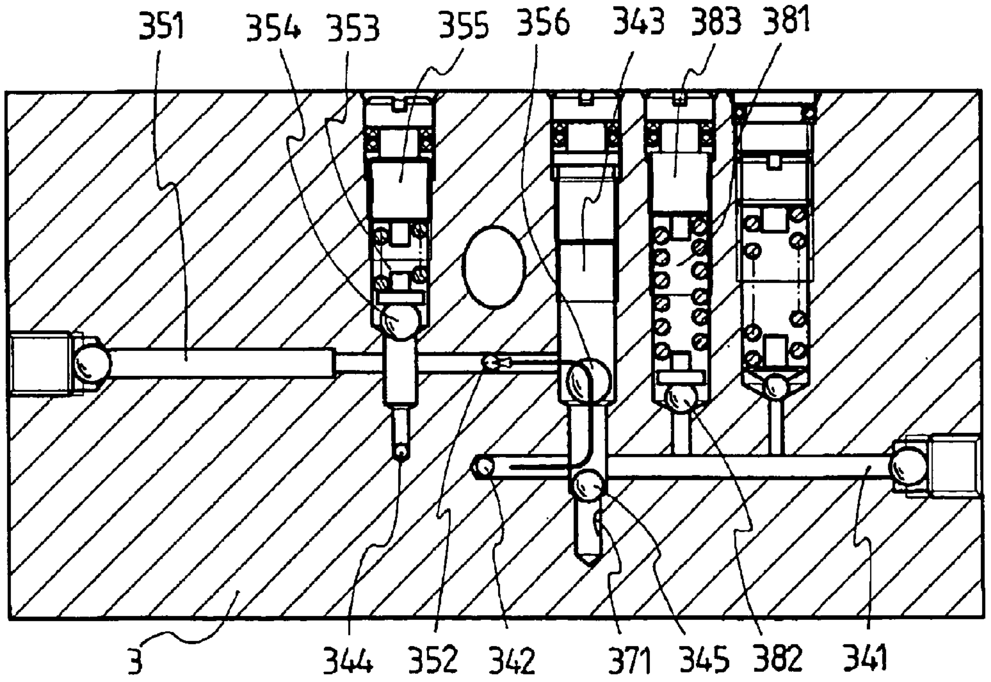
FIG. 11 is a schematic drawing showing hydraulic oil pumped into the rapid-lifting oil chamber according to the present invention.
Figure 12:
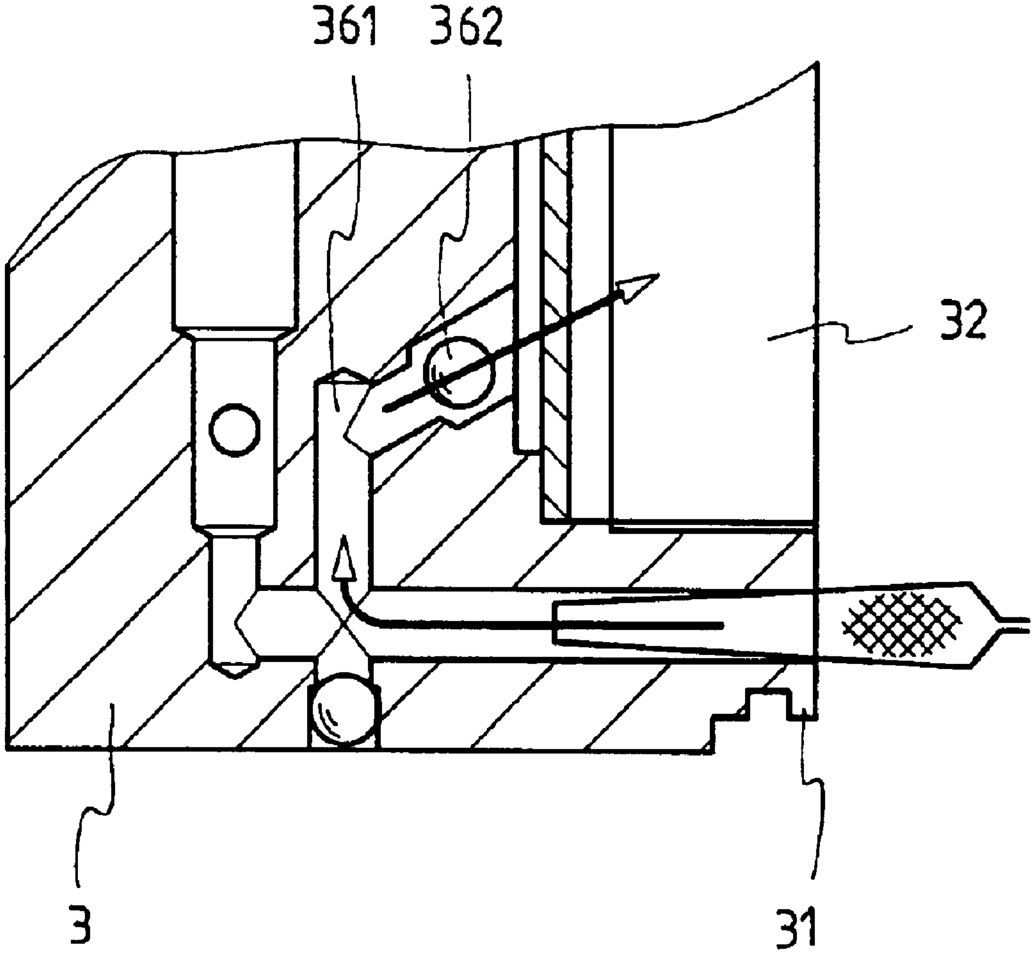
FIG. 12 is a schematic drawing showing hydraulic oil supplied from the oil accumulation chamber to the high-pressure oil chamber according to the present invention.
Figure 13:
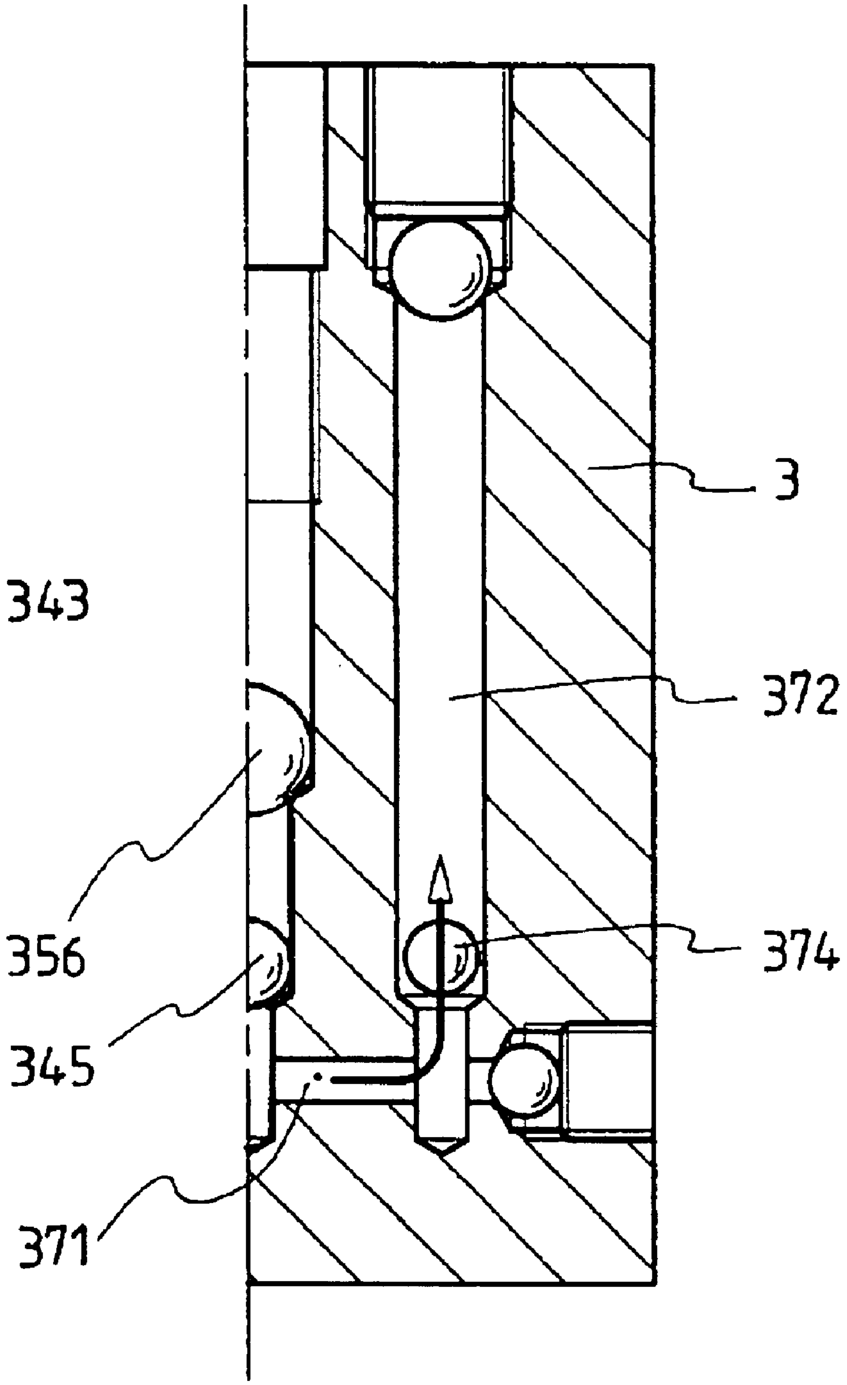
FIG. 13 is a schematic drawing showing hydraulic oil supplied from the oil accumulation chamber to the rear buffer chamber according to the present invention.
Figure 16:
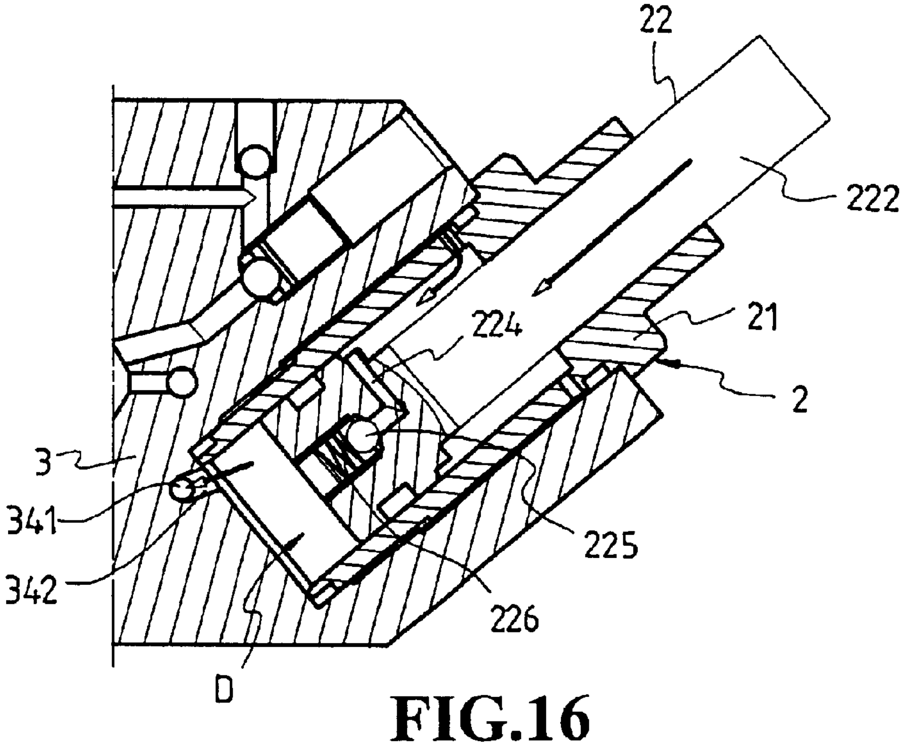
FIG. 16 is a schematic drawing showing hydraulic oil flowed into the rear buffer chamber according to the present invention.

As an application example of the present invention, the three-shift lifting mechanism is used in a jack 100 and operated as follows:

1. First shift, i.e., rapid movement of the lifting tube 13 to the bottom side of the weights: The plunger 22 of the piston pump 2 is lifted (see FIGS. 8 and 9) to draw hydraulic oil from the oil accumulation chamber A into the front working chamber D via the first oil passage F (hydraulic oil pushes open the steel ball 345), and simultaneously to draw hydraulic oil from the rear buffer chamber E into the front working chamber D via the oil hole 224 and the steel ball 225, thereafter the plunger 22 of the piston pump 2 is moved back to compress hydraulic oil out of the front working chamber D into the rapid-lifting oil chamber C through the second oil passage G. Because the lifting rod 13 does not bear any weights at this time, the rapid-lifting oil chamber C which has a relatively smaller cross section is selected to lift the lifting rod 13, and therefore the lifting rod 13 can be rapidly lifted to the bottom side of the weights within one down stroke of the plunger 22. During rapid lifting of the lifting rod 13, the high-pressure oil chamber B is turned into a negative pressure status, therefore hydraulic oil is sucked from the oil accumulation chamber A to the high-pressure oil chamber B via the third oil passage H (see FIG. 12) for further working upon next down stroke of the plunger 22. Upon down stroke of the plunger 22 to squeeze hydraulic oil out of the front working chamber D, the rear buffer chamber E is in a negative pressure status, therefore hydraulic oil is sucked from the oil accumulation chamber A into the rear buffer chamber E via the fourth oil passage I (see FIG. 13 and FIG. 16) for further quick supply of hydraulic oil to the front working chamber D during next upstroke of the plunger 22.

Figure 14:
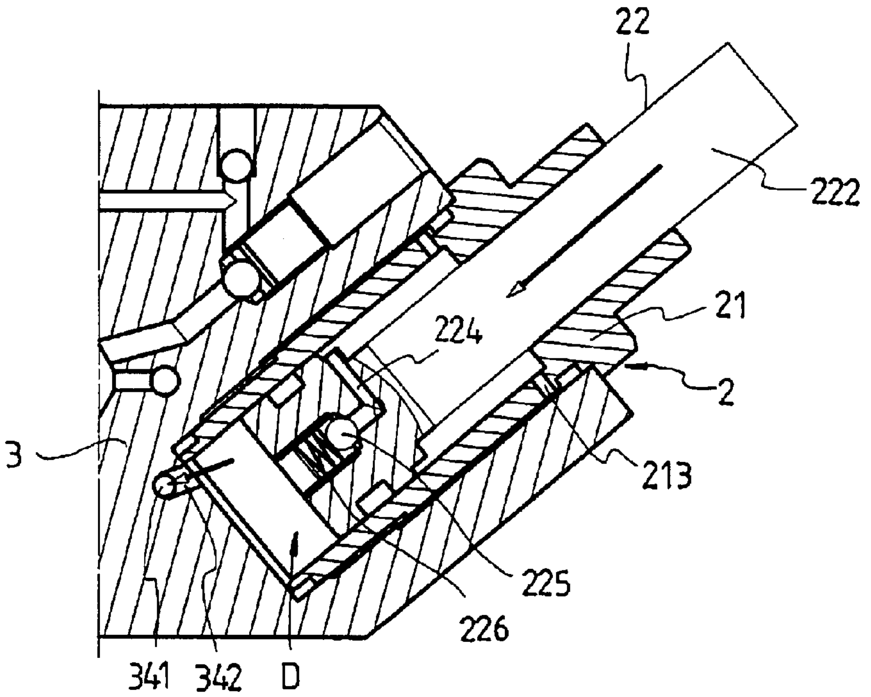
FIG. 14 is a schematic drawing showing hydraulic oil pumped into the second oil passage according to the present invention.
Figure 15:
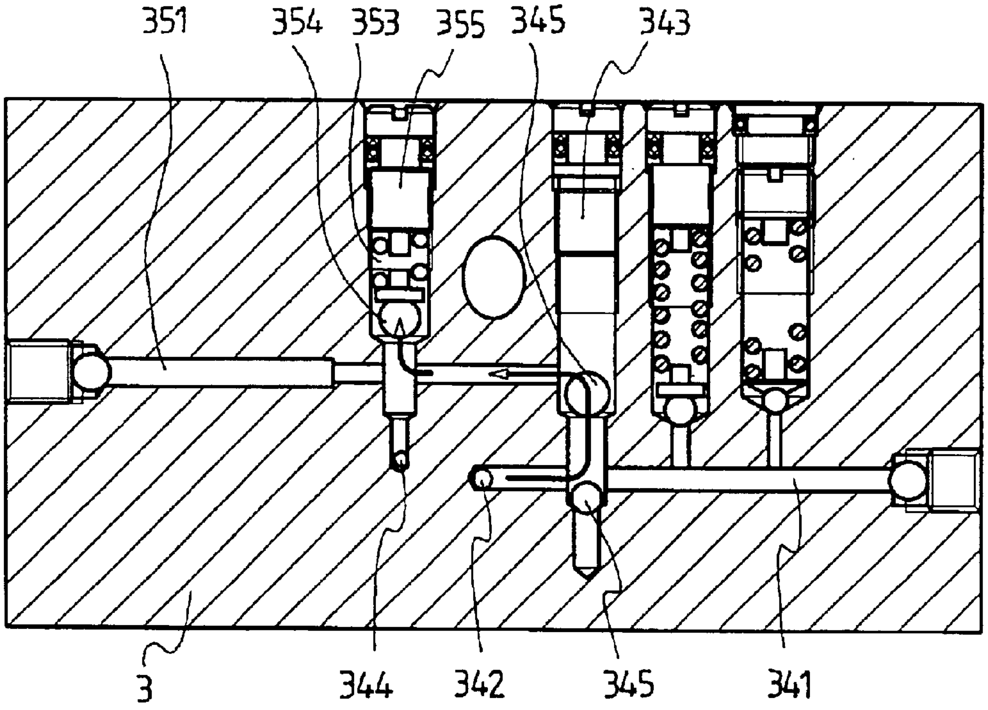
FIG. 15 is a schematic drawing showing hydraulic oil pumped into the high-pressure oil chamber according to the present invention.
Figure 17:
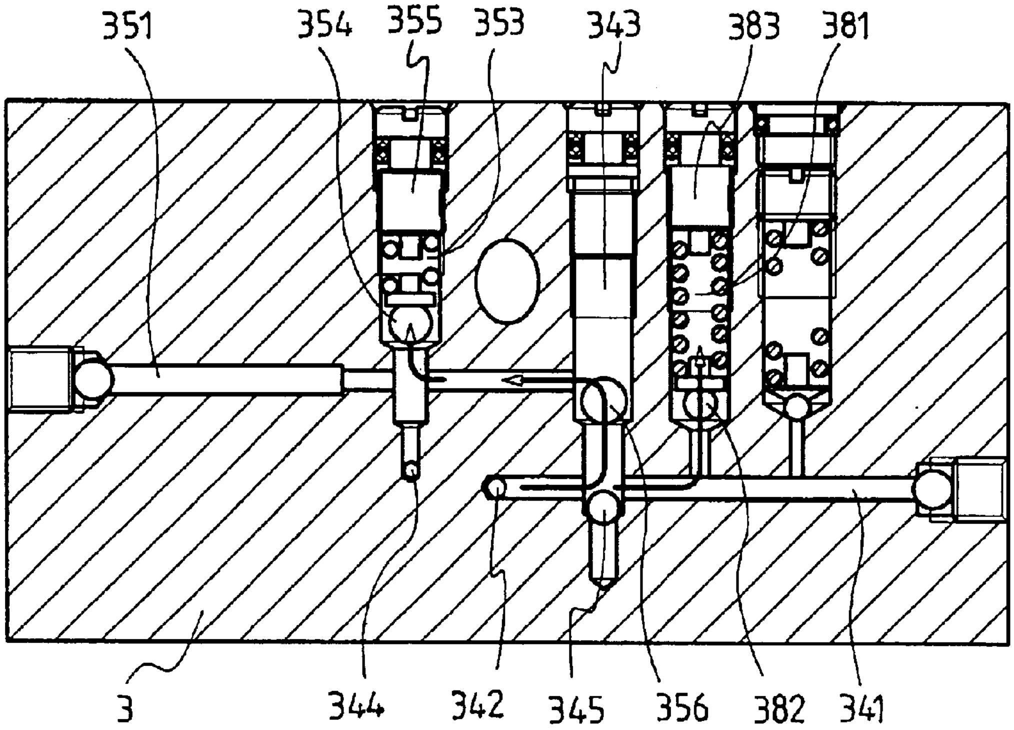
FIG. 17 is a schematic drawing showing hydraulic oil shunted into the rear buffer chamber upon an overload at the lifting tube according to the present invention.

2. Second shift, i.e., the lifting action of the lifting tube 13 to raise the weights: Repeating the pumping action of the plunger 22 of the piston pump 2 (see FIGS. 14 and 15) to fill up the front working chamber D with hydraulic oil. Because the lifting tube 13 is stopped at the bottom side of the weights at this time, down stroke of the plunger 22 causes hydraulic oil to pass from the second oil passage G into the high-pressure oil chamber B via the steel ball 354 and the pressure regulator 355, and therefore the high-pressure oil chamber B which has a relatively greater cross section is used to lift the lifting tube 13 to raise the weights. During down stroke (compression stroke) of the plunger 22 to squeeze hydraulic oil out of the front working chamber D, the rear buffer chamber E is changed into a negative pressure status therefore hydraulic oil is sucked from the oil accumulation chamber A into the rear buffer chamber E via the fourth oil passage I (see FIGS. 13 and 16) for further quick supply of hydraulic oil to the front working chamber D during next upstroke of the plunger 22.
3. Third shift, i.e., the lifting action of the lifting tube 13 upon an overload: Repeating the pumping action of the plunger 22 of the piston pump 2 (see FIGS. 16 and 17) to fill up the front working chamber D with hydraulic oil. Upon down stroke of the plunger 22 after the front working chamber D has been filled up with hydraulic oil, hydraulic oil is forced into the high-pressure oil chamber B to lift the lifting tube 13. If the weight is overload at this time, a part of hydraulic oil pumped by the piston pump 2 is shunted from the second oil passage G to the fifth oil passage I (see FIG. 17) and then to the rear buffer chamber E in the piston pump 2 (see FIG. 16), and a part of hydraulic oil pushes open the steel ball 354 and the pressure regulator 365 and then enter the high-pressure oil chamber B to lift the lifting tube 13 (see FIG. 17) and to overcome the pressure of the weights, achieving a safety lifting action.

During return stroke of the lifting tube 13 to lower the weights, hydraulic oil passes from the high-pressure oil chamber B and the rapid-lifting oil chamber C to the oil accumulation chamber A via the seventh oil passage L and the sixth oil passage K respectively, enabling the lifting tube 13 to be lowered.

A prototype of three-shift lifting mechanism has been constructed with the features of FIGS. 1~18. The three-shift lifting mechanism functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A three-shift lifting mechanism comprising:

a hydraulic device, said hydraulic device comprising a cylindrical casing, a barrel, a lifting tube, and a small center tube, said casing being a double open end cylinder, said barrel being a double open end member axially inserted into the inside of said casing and defining with said casing an oil accumulation chamber in between said casing and said barrel, said lifting tube being an one open side tube axially mounted in said barrel and forwardly extended out of said casing and adapted to lift the weights, said lifting tube having an axial center hole axially extended to a rear open side thereof, a piston ring disposed at the periphery thereof near the rear open side and pressed on an inside wall of said barrel, and a high-pressure oil chamber defined within said barrel behind said piston ring, said small center tube being a double open side tube inserted into the axial center hole inside said lifting tube and defining therein a rapid-lifting oil chamber;

a piston pump adapted to pump hydraulic oil into said hydraulic device to lift said lifting tube, said piston pump comprising a housing and a plunge axially slidably mounted in said housing, said housing being a hollow cylindrical member having at least one oil hole cut through the periphery thereof in communication with the inside space thereof, said plunger comprising a piston of relatively bigger diameter disposed at a front side inside said housing and a piston rod of relatively smaller diameter disposed at a rear side and extended out of said housing, said piston having a plurality of annular flanges extended around the periphery thereof and pressed on an inside wall of said housing and defining the inside space of said housing into a front working chamber and a rear buffer chamber, said piston having an oil hole axially backwardly extended from the center of a front side thereof and then turned sideways to the periphery thereof in communication between said front working chamber said rear buffer chamber, and an one-way valve means formed of a spring member and a steel ball and mounted in the oil hole of said piston to control one-way flowing of hydraulic oil from said rear buffer chamber to said front working chamber; and a valve block adapted to accommodate said hydraulic device and said piston pump, said valve block comprising a front coupling flange fitted into a rear open side of said cylindrical casing, a recessed portion disposed at the center of said front coupling flange and adapted to accommodate said barrel and said small center tube, a rear receiving hole adapted to accommodate said piston pump and to block said front working chamber, a first oil passage extended from said oil accumulation chamber to said front working chamber, a second oil passage extended from said front working chamber to said high-pressure oil chamber and said rapid-lifting oil chamber, a third oil passage extended from said oil accumulation chamber to said high-pressure oil chamber, a fourth oil passage extended from said oil accumulation chamber to said rear buffer chamber, a fifth oil passage shunted from said second oil passage and extended to said rear buffer chamber, a sixth oil passage extended from said rapid-lifting oil chamber to said oil accumulation chamber, and a seventh oil passage extended from said high-pressure oil chamber to said oil accumulation chamber.

2. The three-shift lifting mechanism 1, wherein said first oil passage is formed of a first transverse oil hole, an oil hole extended from a bottom end of said first transverse oil hole to said rear receiving hole, a stepped first longitudinal oil hole extended across said first transverse oil hole, an oil hole extended from a bottom end of said stepped first longitudinal oil hole to a front side of said valve block in communication with said oil accumulation chamber, and an one-way valve formed of a steel ball and mounted in said stepped first longitudinal oil hole and stopped between the oil hole oil hole, which extends from said first transverse oil hole to said rear receiving hole, and the oil hole, which extends from said stepped first longitudinal oil hole to said oil accumulation chamber.

3. The three-shift lifting mechanism as claimed in claim 1, wherein said second oil passage is formed of a second transverse oil hole in fluid communication with said first longitudinal oil hole, an oil hole extended from said second transverse oil hole to said rapid-lifting oil chamber, a second longitudinal oil hole extended across said second transverse oil hole, a steel ball mounted in said second longitudinal oil hole and working as an one-way valve means, a pressure regulator disposed at a top end of said second longitudinal oil hole, an oil hole extended from said second longitudinal oil hole to said high-pressure oil chamber, a steel ball mounted in said first longitudinal oil hole between said first transverse oil hole and said second transverse hole and working as one-way valve means.

4. The three-shift lifting mechanism as claimed in claim 1, wherein said third oil passage comprises a curved oil hole extended from a front side of said front coupling flange of said valve block to said recessed portion, a steel ball mounted in said curved oil hole and working as one-way valve means.

5. The three-shift lifting mechanism as claimed in claim 2, wherein said fourth oil passage comprises an oil hole shunted from said first longitudinal oil hole below the steel ball in said first longitudinal oil hole, a third longitudinal oil hole disposed inside said valve block and across the oil hole shunted from said first longitudinal oil hole, an oil hole extended from said third longitudinal oil hole to said rear receiving hole, and a steel ball mounted in said third longitudinal oil hole and working as one-way valve means.

6. The three-shift lifting mechanism as claimed in claim 2, wherein said fifth oil passage is formed of a fourth longitudinal oil hole in fluid communication with said first transverse oil hole, a steel ball mounted in said fourth longitudinal oil hole and working as one-way valve means, a pressure regulator mounted in said fourth longitudinal oil hole above the steel ball in said fourth longitudinal oil hole, and an oil hole in fluid communication between said fourth longitudinal oil hole and said third longitudinal oil hole.

7. The three-shift lifting mechanism as claimed in claim 1, wherein said sixth oil passage is formed of an oil hole disposed at said recessed portion of said valve block, a steel ball mounted in the oil hole at said recessed portion and working as one-way valve means for enabling hydraulic oil to pass from said rapid-lifting oil chamber to said oil accumulation chamber, a pressure regulator mounted in the oil hole of said sixth oil passage above the corresponding steel ball, an oil hole in fluid communication with the oil hole at said recessed portion and said oil accumulation chamber.

8. The three-shift lifting mechanism as claimed in claim 1, wherein said seventh oil passage is an oil hole having one-way valve means mounted therein to control the flowing direction of hydraulic oil, for enabling hydraulic oil to flow backwards from said high-pressure oil chamber to said oil accumulation chamber via said seventh oil passage upon return stroke of said lifting tube.

* * * * *